March 24, 1953        N. CORDIS        2,632,423
FEED DISPENSER
Filed Nov. 1, 1947        2 SHEETS—SHEET 1
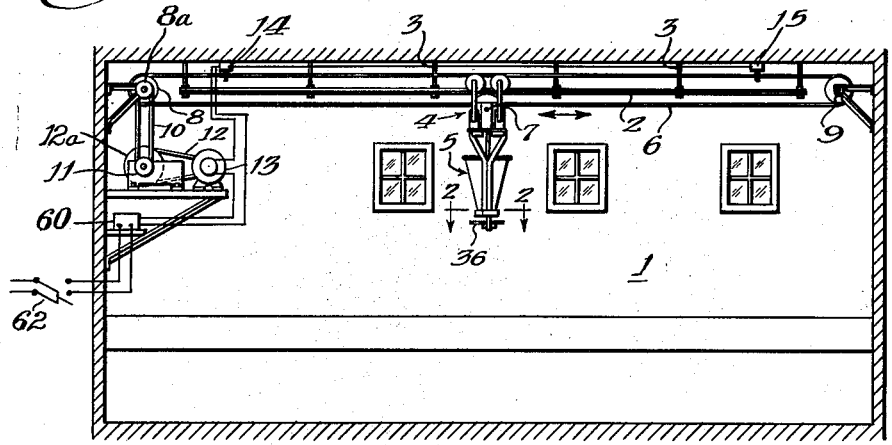
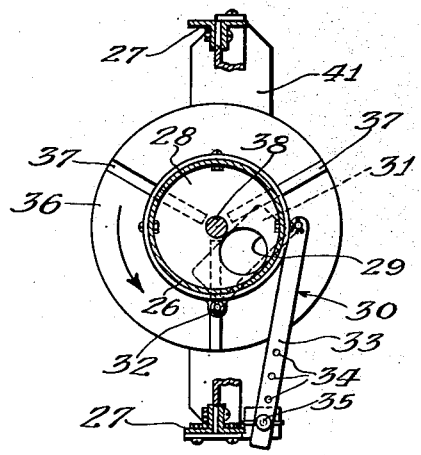
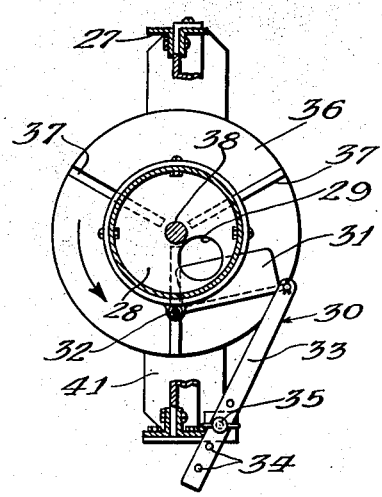
Inventor:
Nat Cordis
By William S. Nordburg
Attorney March 24, 1953

N. CORDIS 2,632,423

FEED DISPENSER

Filed Nov. 1, 1947

Inventor:
Nat Cordis
By William S. Nordberg, Jr.
Attorney

Patented Mar. 24, 1953

2,632,423

UNITED STATES PATENT OFFICE 2,632,423

FEED DISPENSER

Nat Cordis, Silver Lake, Wis.

Application November 1, 1947, Serial No. 783,548

6 Claims. (Cl. 119—56)

This invention relates to a feed dispenser and more particularly to a scratch feed dispenser for use in chicken or hen houses.

It has been recognized in recent years, by those in the business of supplying eggs to the commercial markets, that far greater success can be obtained from the chickens if they are exposed to a minimum of contact with outside elements which would tend to disturb or frighten them. It has also been determined that chickens are not disturbed or frightened by sounds or movements with which they are familiar. To this end, therefore, it has been common practice to permit only certain employees access to the chicken houses for a minimum period of time during the day whereupon these employees become familiar to the chickens. It is also recognized, however, that greater efficiency can be obtained in the production of eggs by the chickens if all contact with outside disturbances could be further reduced.

It is an object of this invention, therefore, to provide a mechanism for distributing scratch feed to hens in the chicken house which can be operated completely at a point remote from the view or sound of the chicken, and it is a further object to provide such a dispenser that will distribute feed uniformly over the entire area of the house and which can be so controlled as to vary the distribution at the will of the operator. It is yet a further object to provide a dispenser which will operate at a sufficient distance from the chickens so as to prevent any possible injury to the same by their scurrying into it when it is in operation. Further objects and advantages will be apparent from the following description of my invention.

To obtain the aforesaid objects, I have provided dispensing apparatus which includes an overhead conveyor extending the length of the chicken house and a feed distributor which is supported on a carriage adapted to be moved along the conveyor track. The carriage is driven with electric power so that it may travel from one end of the chicken house to the other at the will of the operator or automatically. The distributor includes a small hopper having an outlet valve at the base thereof leading to a centrifugal distributor plate. This centrifugal distributor plate scatters feed from the hopper over a circular area depending upon the speed of the distributor. It is powered by suitable mechanism through the movement of the carriage along the conveyor. Thus the speed of the distributor and hence the area over which the feed is scattered, may be regulated by the choice of gearing in the mechanism or by the speed at which the carriage travels along the conveyor track. In this way it is seen that the feed may be distributed to the outermost walls of the hen house or merely over the center area of the house, depending upon the particular layout.

My invention will be better understood by reference to the following description of a preferred embodiment, and particularly by reference to the drawings forming a part hereof, wherein like parts bear like numerals and wherein:

Fig. 1 is a diagrammatic side elevation of a chicken house equipped with my apparatus.

Fig. 2 is an enlarged section taken along the line 2—2 of Fig. 1.

Fig. 3 is an enlarged section taken along the line 2—2 of Fig. 1 showing parts in different operative positions.

Figure 4:
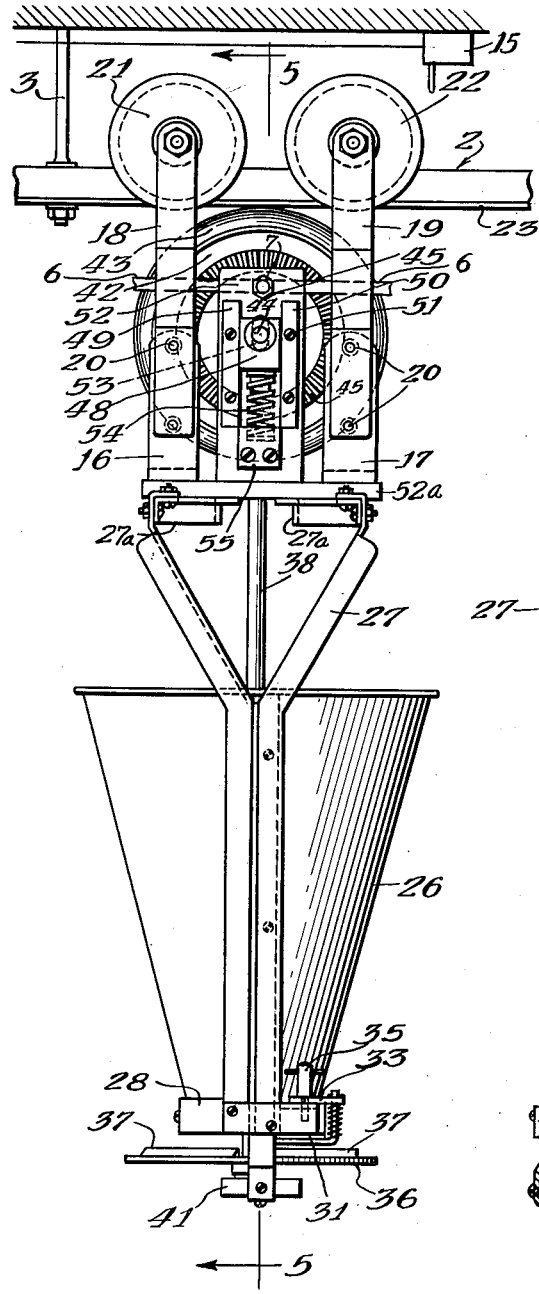
Fig. 4 is an enlarged side elevation of my feed distributing unit and carriage.
Figure 5:
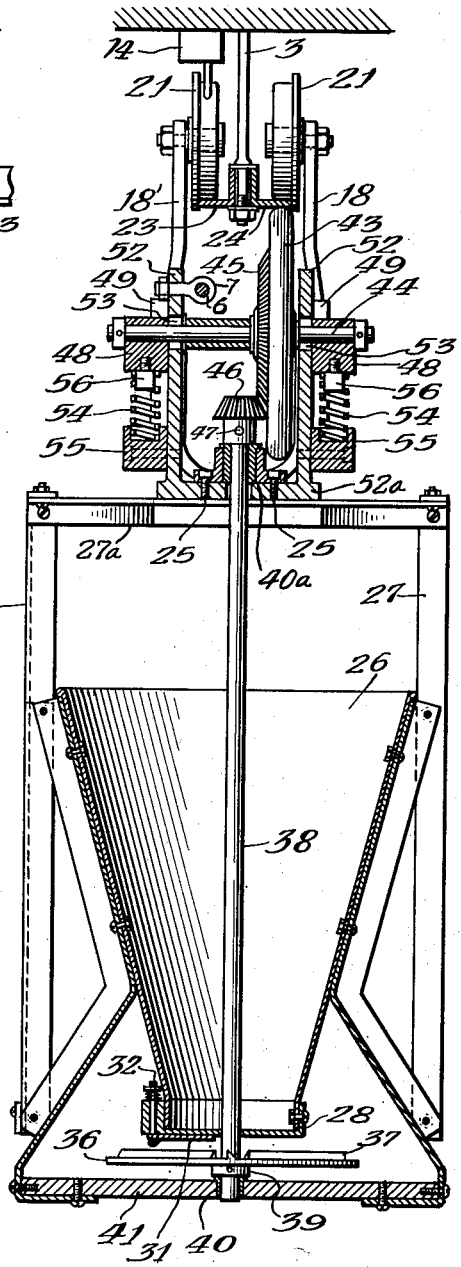
Fig. 5 is an enlarged section taken along the line 5—5 of Fig. 4.

Within a chicken house 1, which is usually a narrow elongated building having a roost along one side and the nests along the other with a central area covered with bedding, I suspend from the ceiling a conveyor track 2. The track extends along the entire length of the house and is supported at suitably spaced points by brackets 3. Adapted to ride on the track is a carriage 4 beneath which depends a chicken feed distributor or spreader 5. The carriage is moved along the track by means of an endless cord 6 which is secured to the carriage at point 7 and passes over a pair of pulleys 8 and 9 at each end of the house. One of these pulleys is a driving pulley for the cord and it in turn is fixed to a shaft which rotates with pulley 8a which is driven by a belt 10 running over pulley 11a connected to a transmission 11, which in turn is driven by pulley 12a connected by a belt 12 to a motor 13. The aforesaid mechanism for the carriage is all shown as mounted within the chicken house, but it should be understood that where the chicken house is equipped with a feed room that this mechanism is preferably housed therein and in any case the switch 62 for the motor is outside the house.

To control movement of the carriage and hence the spreader from one end of the house to the other, reversing switches 14 and 15 are provided which are suitably connected by wires in circuit with the motor for reversing the same. By these switches when the carriage reaches one end of the house, the switch 14 or 15 will be tripped by wheel 21 or 22 and the motor reverse so as to move the carriage back in the opposite direction. Other electrical arrangements including timer 60 may be provided whereby the number of trips per hour may be timed automatically, but in most cases a farm hand at feed time will operate the motor which will permit the carriage and the spreader to make one round trip and then will turn off the motor.

The carriage 4 comprises a pair of U-shaped members 16 and 17 to which are secured pairs of straps 18, 18' and 19, 19' in a suitable manner such as by bolts 20. The curved lower ends of the U-shaped members 16 and 17 are fixed as by welding or bolting to the upper surface of base 52a. At the upper end of the straps are pairs of wheels 21 and 22 which are adapted to ride on the track 2. The track is preferably formed by a pair of angles 23 and 24.

The spreader 5 is secured by a pair of bowed top cross members 27a of frame 27 to the base 52a of the carriage 4 by bolts 25 or in any other suitable manner such as welding. The spreader 5 preferably comprises a conically shaped hopper 26 which is carried by a suitable frame 27 secured to the bottom of the carriage by welding to the base 52a. The hopper is closed off at the bottom by a cap 28 having a discharge port 29 therein (Figs. 2 and 3). Valve means 30, comprising a plate 31, swingably mounted on a pivot 32 permits regulating the flow of feed from the hopper through the port. The plate may be adjustably positioned by means of an adjusting bar 33 having a plurality of holes 34 for securing the bar in various positions, as by wing screw 35 adapted to be screwed into a portion of the frame 27.

The spreading of the feed is accomplished by means of a rotating plate 36 having a plurality of radial ribs 37 and which is mounted directly beneath the base of the hopper. The plate 36 is secured to a rotating shaft 38 by a pin and collar 39. The shaft in turn is rotatably held securely against longitudinal movement by the collar 39 in bearing 40 in a cross member 41 of the frame 27 at the bottom, and in another bearing 40a fixed by bolts 25 in the carriage 4.

Rotation of the rod is effected by the movement of the carriage by means of a driving wheel 42 having a rubber tire 43 or a tire of other gripping material which is rotatably mounted on an axle 44. Contact with the track of the conveyor is maintained under suitable pressure to insure a good friction drive. A ring gear 45 on the inside of the drive wheel 42 cooperates with a small bevel gear 46 secured on the end of the rod 38 by a pin 47.

The pressure contact for the drive wheel 42 is obtained by suspending the axle 44 in a pair of slide blocks 48 adapted to operate within a pair of slides 49 and 50 secured by screws 51 to a pair of opposing frame members 52 integral with base 52a forming a part of the carriage. Longitudinal holes 53 in each of the frame members 52 permit the passage and vertical movement of the axle. The slide blocks 48 are supported within the slides by a pair of coil springs 54 which are normally under compression and hence urge the axle upward. These springs are suitably set in sockets 55 secured to the frame members 52. The upper end of each spring is held against lateral movement by suitable pins 56 screwed into the slide blocks.

It will be apparent from the above description of my apparatus that as the carriage is pulled along the track by the driving mechanism acting through the cord 6 fixed by grip 7 to frame member 52, the driving wheel 42 will be rotated which in turn will cause a rotation of the rod 39 and the plate 36. Feed flowing from the hopper will be struck by the ribs 37 on the plate and thrown outwardly a distance proportional to the speed of rotation of the plate. Hence, by my apparatus, feed can be distributed to all parts of chicken or hen houses of various widths, by varying either the gear ratio between the ring gear and the bevel gear or by varying the speed at which the carriage is pulled along the track. This is an important feature of my apparatus since it permits the control of the distribution of the feed by the farm hand by regulation of the speed of the motor and it further permits tailoring the apparatus in manufacturing for a particular size house by the simple method of selecting the proper gear ratio.

Other embodiments of my invention will be apparent to those skilled in the art and no limitations are intended by the above description except such as are contained in the following claims.

I claim:

1. In an apparatus for distributing feed in a chicken house, the combination comprising a track carried from the roof of said house and extending along the entire length thereof, a carriage adapted to ride on said track, a feed spreader depending from said carriage and including a rotatable distributing plate, and drive means forming a part of said carriage adapted to rotate said distributing plate in response to the movement of said carriage along said track, said drive means comprising a wheel resiliently journaled in said carriage and riding on the lower side of said track, a friction tread on said wheel, and drive gear means connected to said plate and said wheel.

2. An apparatus for distributing feed in a chicken house comprising a track carried from the roof of said house and extending along the entire length thereof, a carriage adapted to ride on said track, a feed spreader depending from said carriage including a rotatable distributing plate carried on a vertical shaft, a driving wheel mounted in said carriage and adapted to roll on said track, and gear means between said driving wheel and said rotatable shaft for rotating said shaft upon rotation of said driving wheel.

3. The apparatus of claim 2 including a resilient support for said driving wheel adapted to urge said wheel continuously into frictional contact with said track.

4. The apparatus of claim 2 wherein said gear means includes a ring gear associated with said driving wheel and a pinion gear engaging said ring gear fixed to the upper end of said vertical shaft.

5. An apparatus for distributing feed comprising an overhead track, a carriage adapted to be moved on said track, said carriage including a pair of generally U-shaped frame members, sets of wheels rotatably mounted on the open end of said U-shaped members, said wheels being adapted to ride on said track, a frame depending from said U-shaped members, a hopper carried by said frame, a base plate in said hopper having a discharge port therein, valve means for regulating the rate of discharge of said feed from said hopper, a rotatable distributing plate positioned beneath said discharge port, a rotatable shaft carrying said distributor plate journalled in one end in a bearing fixed in said frame and at the other end in a bearing fixed in said carriage, a drive wheel resiliently mounted in said carriage, a ring gear on said driving wheel, a pinion on the upper end of said rotatable shaft engaging said ring gear, and means for moving said carriage along said track alternately from one end to the other.

6. An apparatus for distributing scratch feed in a chicken house comprising an overhead track, a carriage adapted to be moved on said track, a feed distributing means depending from said carriage, said feed distributing means being adapted to scatter feed over a substantial area below said track only upon movement of said carriage, means for moving said carriage comprising a pair of pulleys at opposite ends of said track, an endless cord secured to said carriage, means fixing said carriage to said cord, a reversible motor means for driving said endless cord, and switch means actuated by the movement of said carriage along said track for alternately reversing said motor and automatically causing said carriage to travel to and fro along said track.

NAT CORDIS.

REFERENCES CITED

The following references are of record in the file of this patent:

UNITED STATES PATENTS

| Number | Name | Date |
|---|---|---|
| 483,623 | Thoren | Oct. 4, 1892 |
| 1,031,736 | Rosenberger et al. | July 9, 1912 |
| 1,263,105 | Plummer | Apr. 16, 1918 |
| 1,574,398 | Kisner | Feb. 23, 1926 |
| 1,731,691 | Webb | Oct. 15, 1929 |
| 2,162,688 | Lawrence | June 13, 1939 |